United States Patent
Hara et al.

(10) Patent No.: US 6,538,686 B2
(45) Date of Patent: Mar. 25, 2003

(54) METHOD FOR TRANSMITTING IMAGE DATA AND COMMUNICATION TERMINAL

(75) Inventors: Yoshihiro Hara, Kishiwada (JP); Yukio Maekawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 169 days.

(21) Appl. No.: 09/754,400

(22) Filed: Jan. 5, 2001

(65) Prior Publication Data

US 2001/0012051 A1 Aug. 9, 2001

(30) Foreign Application Priority Data

Jan. 7, 2000 (JP) .................................... 2000-001251
Jan. 7, 2000 (JP) .................................... 2000-001250

(51) Int. Cl.$^7$ ................................................ H04N 7/14
(52) U.S. Cl. .................................. 348/14.12; 348/14.02
(58) Field of Search .......................... 348/14.01–14.05, 348/14.07, 14.12–14.16; 379/93.08, 93.17, 93.34; 455/556, 557

(56) References Cited

U.S. PATENT DOCUMENTS 6,377,818 B2 * 4/2002 Irube et al. ............... 348/14.02

FOREIGN PATENT DOCUMENTS

| JP | 06-261167 | | 9/1994 |
|---|---|---|---|
| JP | 09-037125 | | 2/1997 |
| JP | 10-84541 | * | 3/1998 |
| JP | 10-070641 | | 3/1998 |
| JP | 10-304334 | | 11/1998 |

* cited by examiner

Primary Examiner—Wing Chan
(74) Attorney, Agent, or Firm—Morrison & Foerster LLP

(57) ABSTRACT

A communication terminal comprises a memory for storing a table in which data for identifying a destination of communication and a resolution of a display device of the destination are associated with each other, an image processor for generating image data with a resolution of the display device of the destination based on the table, and a transmission section for transmitting the image data generated by the image processor. By transmitting the image data with a resolution corresponding to the resolution of the display device of the destination, data volume to be communicated is reduced and wasteful power consumption of battery is suppressed in portable devices.

18 Claims, 15 Drawing Sheets

Fig. 5
TB1
| ADDRESS (AR) | DISPLAY RESOLUTION (KD) |
|---|---|
| 06-6123-4567 | 300×240 |
| 06-6000-1111 | 400×320 |
| ⋮ | ⋮ |
Fig. 6
DTS
| HEADER (HD) | IMAGE DATA (DTG) |
Fig. 7
10
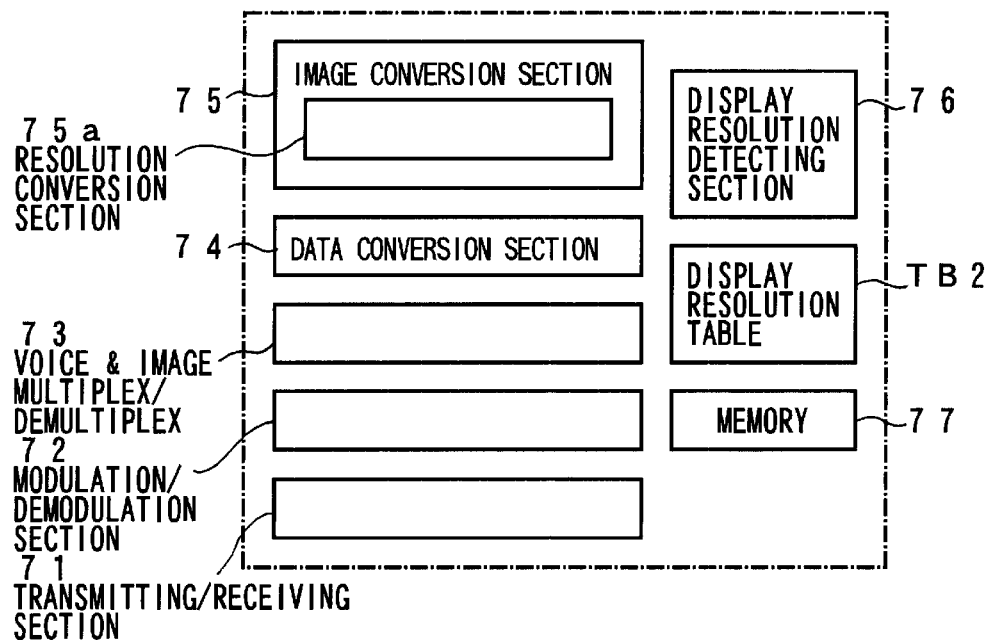
- 75 IMAGE CONVERSION SECTION
  - 75a RESOLUTION CONVERSION SECTION
- 74 DATA CONVERSION SECTION
- 73 VOICE & IMAGE MULTIPLEX/DEMULTIPLEX
- 72 MODULATION/DEMODULATION SECTION
- 71 TRANSMITTING/RECEIVING SECTION
- 76 DISPLAY RESOLUTION DETECTING SECTION
- TB2 DISPLAY RESOLUTION TABLE
- 77 MEMORY

METHOD FOR TRANSMITTING IMAGE DATA AND COMMUNICATION TERMINAL

This application is based on Japanese Patent Application No. 1250/2000 and 1251/2000 filed on Jan. 7, 2000, the contents of which are hereby incorporated by reference.

BACKGROUND OF THE INVENTION

1. Field of the Invention

The present invention relates to a method for transmitting image data, a method for relaying image data, a communication terminal, and a communication management center. The present invention is utilized for portable communication terminals for conducting image communication, such as a portable visual telephone.

2. Description of the Prior Art

Conventionally, communication terminals capable of transmitting and receiving voice and image have been proposed in order to be utilized for wire or wireless visual telephones, teleconference system, other image communication systems or the like.

In such communication terminals, images of subjects taken by a camera are transmitted as a still picture or a motional picture. At transmission of the image, image data are often highly compressed for saving communication cost. Especially, in visual telephones, a screen of the display device is relatively made to be small for miniaturizing the device and simplifying of operation thereof. By connecting a personal computer with a camera and telephone or an audio apparatus, it can be used as a communication terminal for a visual telephone or that for teleconference.

It has been proposed of communication terminals for transmitting image data together with voice, comprising a headset for speaking by the telephone, a memory card storing image data which previously are taken, a liquid crystal display device, etc. (Japanese Unexamined Patent Publication No. 6-261167).

When the above-mentioned communication terminals are used to communicate images, a communication management center for relaying data performs a variety of exchange controls for data exchange.

When case image communication is conducted by using the above-mentioned various communication terminals, the screen sizes of display devices are different depending on types of device of the destination, and thus resolutions of display are varied from each other.

When transmitting the image data from communication terminals, therefore, resolution of the image data to be transmitted is sometimes higher than that of the destination of communication. In such cases, the image is out of frame of the display screen of the destination and therefore, can not be seen easily and furthermore, communication cost increases due to data volume being large. Furthermore, in case of portable communication terminals, there is a problem that operation time becomes shortened because of waste of battery due to large data volume.

Conventionally, the communication management center only relays image data to be transmitted, and does not convert or control the image data according to the resolution of the display device of the communication terminal.

SUMMARY OF THE INVENTION

An object of the present invention is to reduce data volume to be communicated, and to suppress wasteful battery consumption in case of portable devices, by controlling for transmitting image data whose resolution is made to be matched with that of the display device of the destination at the time of transmitting image data from communication terminals.

Another object of the present invention is to reduce data volume to be communicated by converting the resolution of image data to be lowered depending on the resolution of the display device of the destination when relaying image data at the communication management center with which a plurality of communication terminals are connected.

According to a preferred aspect of the present invention, a communication terminal comprises a memory for storing a table in which data for identifying destinations of communication and resolutions of display devices of the destinations are associated with each other, an image processor for generating an image data with a resolution of the display device of the destination based on the table, and a transmission section for transmitting the image data generated by the image processor. Preferably, the terminal further comprises a sensor for taking a picture of a subject and for providing the image processor with the image data. The terminal further comprises a receiving section for receiving image data from the destination and a display section for displaying the image data received at the receiving section. The terminal further comprises an estimating section for estimating a resolution of the display device of the destination based on the received image data.

According to another preferred aspect of the present invention, a communication management center with which a plurality of communication terminals are connected and which transmits and receives data to/from each communication terminal comprises a display resolution detection section for obtaining information about the resolution of the display device of the communication terminal, a resolution conversion section for converting the image data transmitted from the communication terminal into low resolution image data based on the information about the resolution obtained by the display resolution detection section, and a transmission section for transmitting the low resolution image data obtained by converting the data at the resolution conversion section.

The other objects and features of the present invention will be more fully understood from the following detailed description with reference to the accompanying drawings.

BRIEF DESCRIPTION OF THE DRAWINGS

FIG. 5 is a diagram showing an example of a display resolution table.

FIG. 6 is a diagram showing an example of a transmission data format transmitted from the portable terminal.

FIG. 7 is a block diagram showing an example of functions of a communication management center.

DESCRIPTION OF THE PREFERRED EMBODIMENTS

Figure 1:
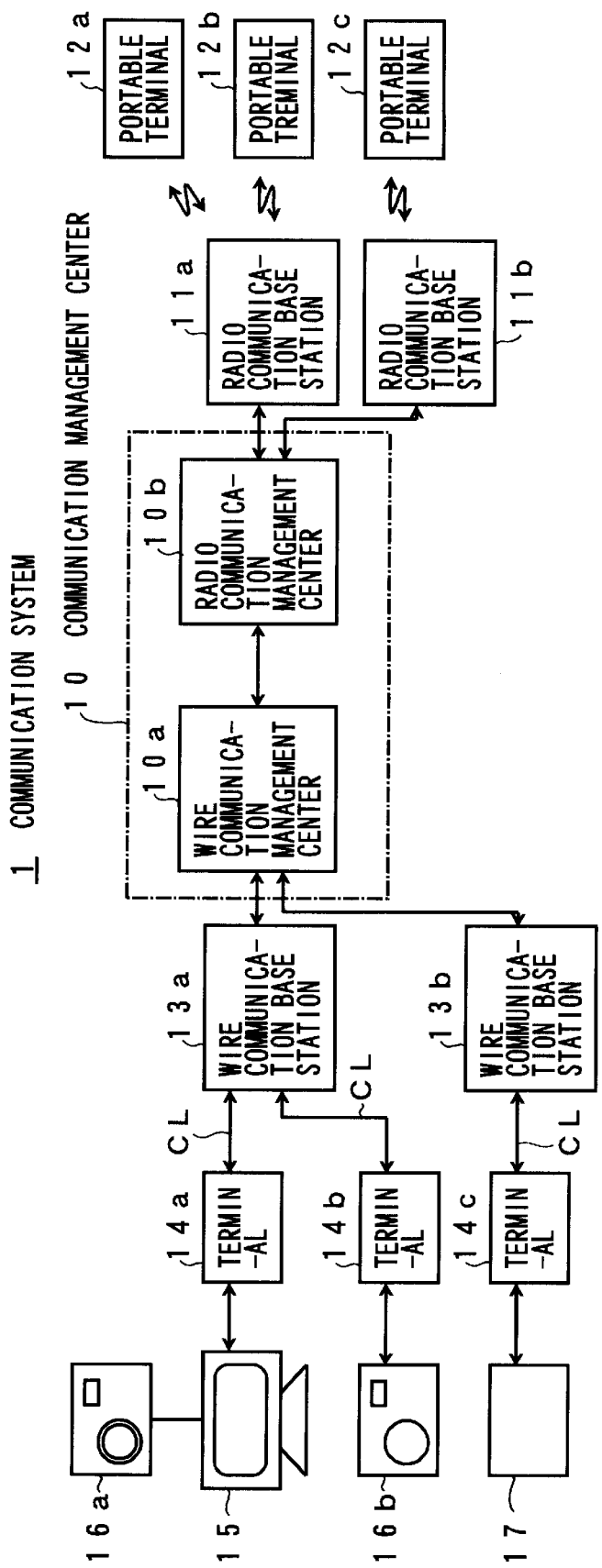
FIG. 1 is a block diagram schematically showing the whole communication system using a communication terminal according to an embodiment of the present invention.

FIG. 1 is a block diagram schematically showing the whole communication system 1 including the communication management center according to the present invention.

Referring to FIG. 1, the communication system 1 comprises a communication management center 10, radio base stations 11a, 11b . . . , portable terminals 12a, 12b . . . connected wirelessly by radio lines with the radio base stations 11a, 11b . . . , wire base stations 13a, 13b . . . , and terminals 14a, 14b . . . connected by cable lines CLs with the wire base stations 13a, 13b . . . .

Various lines such as public lines, dedicated lines, ISDN lines are used as cable lines CLs. The cable lines CLs can also be connected various networks such as LANs (local area networks), WANs (wide area networks), Internets. Any one or whole of the radio base stations 11a, 11b . . . may be referred to as "radio base station 11", and the other stations and terminals are the same.

The communication management center 10 includes a wire communication management center 10a and a radio communication management center 10b. The wire communication management center 10a and the radio communication management center 10b communicate each other, and manage the communication by controlling communication and controlling exchange of the data so that communication among the whole of the radio base station 11 and the wire base station 13 could be possible.

The portable terminal 12 is a digital telephone capable of data communication. A camera is mounted on the portable terminal 12 and it can be used as a visual telephone. Furthermore, the portable terminal 12 can transmit image data imaged (or taken) to the other portable terminal 12 or a terminal device 14, etc. This transmission will be described later in detail.

The terminal device 14 is, for example, an analogue telephone, a modem, a digital terminal equipment, or other communication terminals for data communication, etc., and it is capable of transmitting and receiving voice signals or data via the cable line CL.

A personal computer 15 is connected to the terminal device 14a. A video capture board is mounted on the personal computer 15, and the image taken by a video camera 16a is incorporated into the computer as image data. A microphone and a speaker, both not shown in the figure, are also connected to the personal computer 15, thereby the personal computer 15 can be used as a visual telephone.

A digital camera 16b is connected to the terminal device 14b, thereby the device can transmit the image data taken by the digital camera 16b to the other terminal device 14 or the portable terminal 12.

A portable terminal 17 is connected to the terminal device 14c. The portable terminal 17 is the same as the portable terminal 12, however the portable terminal 17 does not have a function of communication and performs communication via the terminal device 14c. The portable terminal 17 transmits and receives E-mail, etc., transmits and receives image data taken, or the like.

Figure 2:
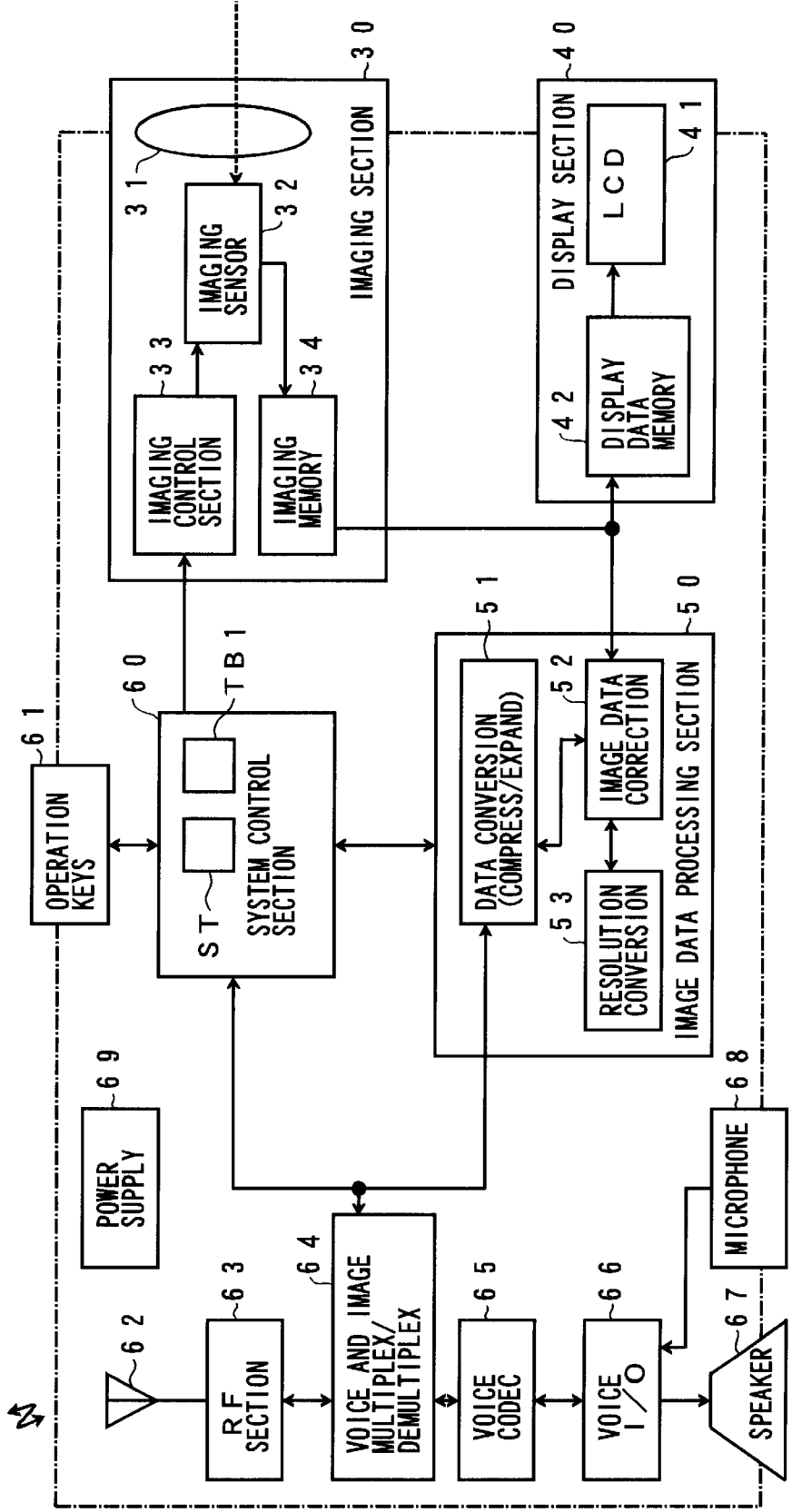
FIG. 2 is a block diagram showing an example of configuration of a portable terminal.
Figure 3:
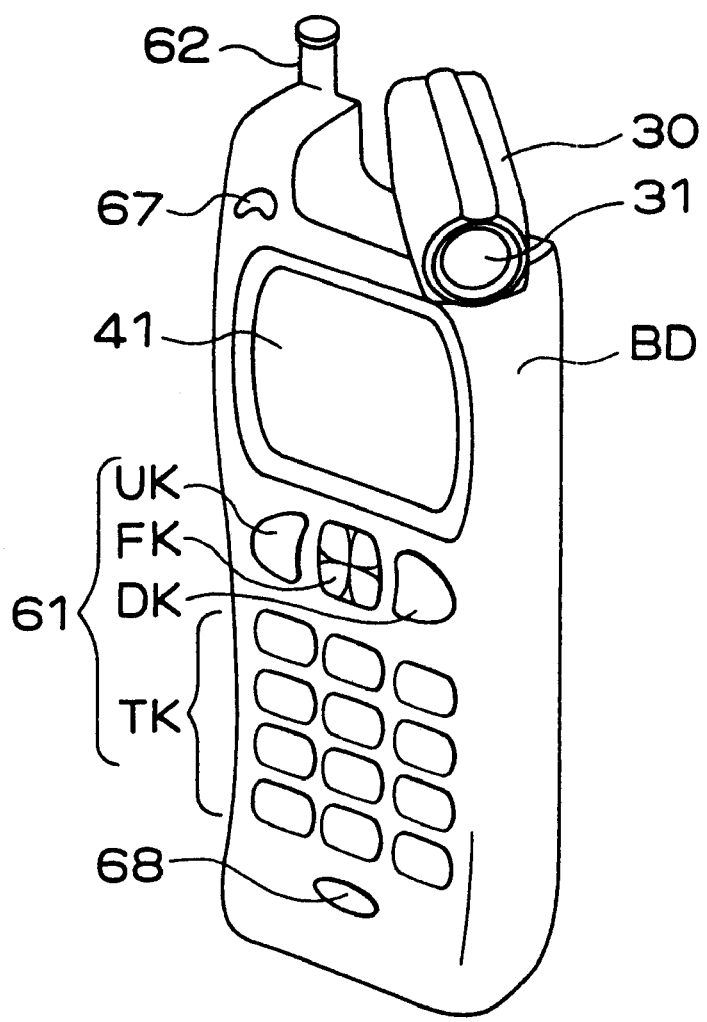
FIG. 3 is a perspective view showing an example of appearance of the portable terminal.
Figure 4A:
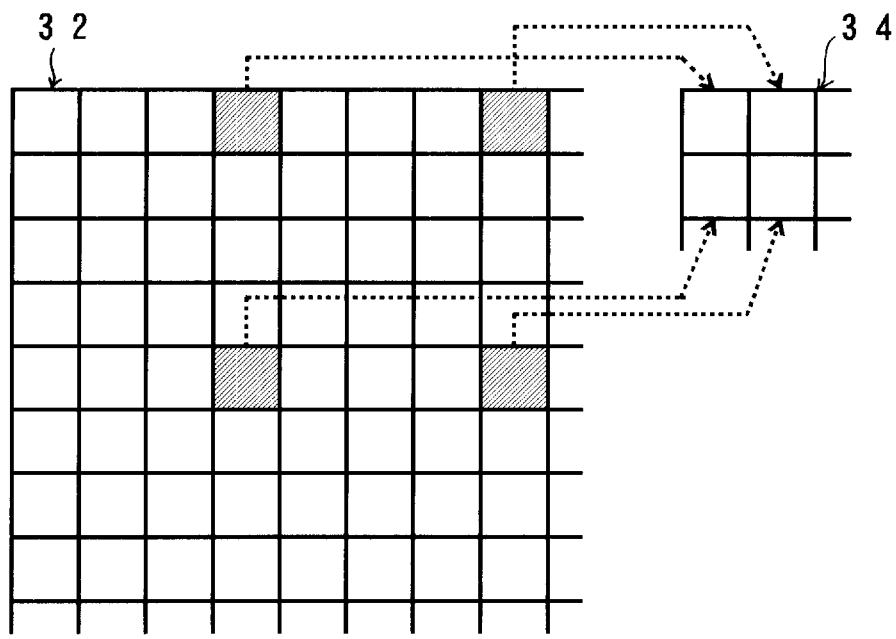
FIGS. 4A and 4B are schematic diagrams for illustrating resolution control by readout control of an imaging sensor.
Figure 4B:
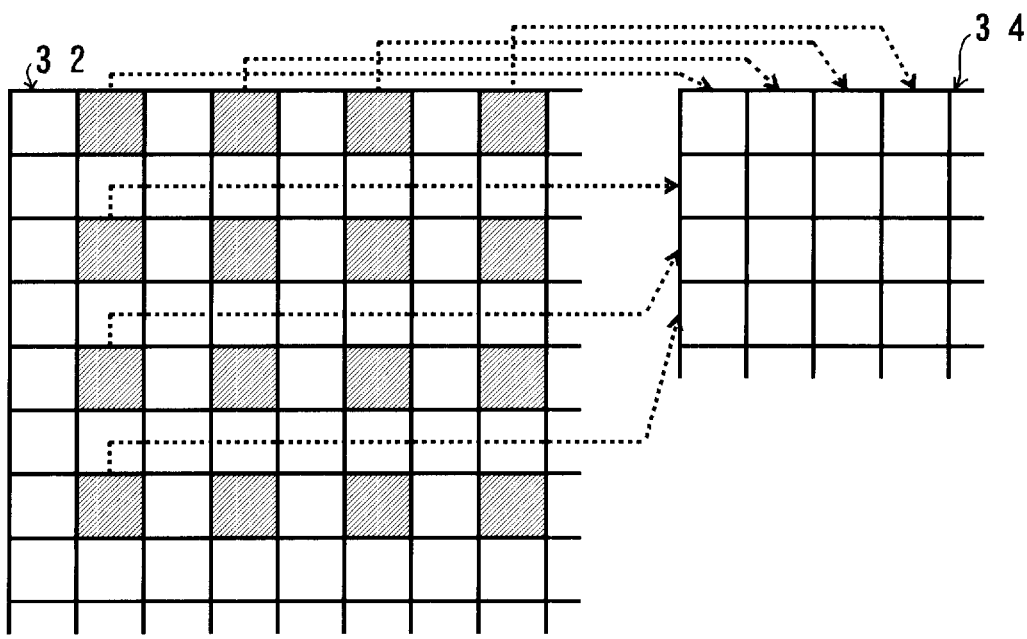

FIG. 2 is a block diagram showing an example of configuration of the portable terminal 12. FIG. 3 is a perspective view showing an example of appearance of the portable terminal 12, and FIGS. 4A and 4B are schematic diagrams for illustrating resolution control by readout control of an imaging sensor 32. FIG. 5 is a diagram showing an example of a display resolution table TB1, and FIG. 6 is a diagram showing an example of a transmission data DTS transmitted from the portable terminal 12.

Referring now to FIGS. 2 and 3, the portable terminal 12 comprises an imaging section 30, a display section 40, an image data processing section 50, a system control section 60, operation keys 61, an antenna 62, an RF (radio frequency) section 63, a voice and image multiplexing/demultiplexing section 64, a voice codec 65, a voice I/O section 66, a speaker 67, a microphone 68, a power supply 69, and a body BD in which these components and sections are accommodated or mounted.

An image processor is provided on the portable terminal 12 for processing and generating image data. The functions of the image data processing section 50, the system control section 60, and the other sections of the portable terminal 12 are partially realized by the image processor.

The imaging section 30 comprises a lens 31, an imaging sensor 32, an imaging controlling section 33, and an imaging memory 34, etc. The imaging sensor 32 is an element for recording digital image of CCD (charge coupled device) or CMOS (complementary metal oxide semiconductor) of an area type. The element of 1.4 million pixels (1,400×1,000 pixels) is used for enabling to record high quality images.

The imaging control section 33 controls readout resolution of the imaging sensor 32 and time duration of imaging, etc. (integration time duration) corresponding to imaging mode specified by the system control section 60. The imaging memory 34 stores image data taken by the imaging sensor 32 and attribute information thereof.

In other words, by the imaging control section 33 controlling readout of the imaging sensor 32, image data of low resolution corresponding to the resolution of the display device of the destination is stored in the imaging memory 34. The imaging control section 33 can perform various patterns of the readout control.

For example, the imaging control section 33 performs thinning-out control of the pixels as a readout control. As shown in FIG. 4A, image data is thinned out so as to extract the image data in the ratio of 1 pixel in every 4 pixels in both directions of row and column of the imaging sensor 32. Thereby, the image data whose resolution is reduced to 1/16 is stored in the imaging memory 34.

As shown in FIG. 4B, by extracting the image data in the ratio of 1 pixel in every 2 pixels in both directions of row and column of the imaging sensor 32, the image data whose resolution is reduced to 1/4 is stored in the imaging memory 34.

Alternatively, in another readout control of, for example, the case of FIG. 4A, instead of the above-described thinning-out process, an average value of 16 pieces of image data is calculated and this average data value is used as representative image data of 16 pixels. Or, a sum value of 16 pieces of image data is calculated and this sum value is used as representative image data of 16 pixels. In case of summing, the image can be brightly pictured even if light is insufficient around the subject. Therefore, this technique is conveniently used under the situation of insufficient light or when high-speed imaging is required, and, moreover, noise is reduced.

As shown in FIG. 3, a part of the imaging section 30 including the lens 31 is provided in a vertically and horizontally rotatable manner on the upper portion of the body BD of the portable terminal 12 so as to change the imaging direction. If the user who uses the portable terminal 12 takes an image of himself/herself, he/she stretches out his/her arm a little with grasping the body BD, and makes the imaging section 30 direct toward his/her own face, slightly aparting the section from his/her body. Since the image taken by the imaging section 30 is displayed on an LCD (liquid crystal display) 41, the user can adjust his/her posture appeared at imaging section 30 while observing the LCD 41.

In order to speak over with the portable terminal 12 under this situation, the user speaks to the microphone 68 with somewhat loud voice. Then little louder voice is output from the speaker 67. An earphone can be utilized.

The display section 40 includes the LCD 41 and a display data memory 42, etc. The LCD 41 is, for example, a color LCD of 320×240 pixels and displays the received image data, the image data to be transmitted, messages, communication conditions, and the other information. The display data memory 42 stores temporarily the data for displaying.

The image data processing section 50 comprises a data conversion section 51, an image data correction section 52, and a resolution conversion section 53, etc. The data conversion section 51 expands the image data transmitted from the destination and compress it for transmitting.

The image data correction section 52 converts the image data transmitted from the destination into the color data suitable for displaying on the LCD 41 of this terminal, and also the section 52 converts the image data into that with the color balance which was set by the user's preference. The image data taken by the imaging section 30 is subject to optimal correction after its condition is judged.

The resolution conversion section 53 converts the resolution of the received image data corresponding to the LCD 41 depending on the setting status of the imaging mode of this terminal. As the process for converting the resolution, the resolution may be decreased by thinning out the image data or the resolution may be increased by interpolating the image data.

The resolution conversion section 53 decreases the resolution of the image data to be transmitted corresponding to the imaging mode specified by the system control section 60 and converts the image data into that with low resolution.

Normally, the system control section 60 controls the imaging control section 33, thereby generating the image data with desired resolution. Furthermore, the system control section 60 can control the resolution conversion section 53.

In this case, the resolution conversion section 53 can be used both for converting the resolution of the image data received and for converting the resolution of the image data to be transmitted, therefore the usage efficacy of the circuit element is improved, thereby contributing to miniaturization of the apparatus and production cost down.

The resolution conversion section 53 can use various known methods for converting the resolution, for example, a nearest neighbor interpolation, a bilinear interpolation, a cubic convolution interpolation, or bi-cubic interpolation, or the like.

The system control section 60 has a display resolution table TB1 for referring the imaging mode at the time of setting the mode.

As shown in FIG. 5, the display resolution table TB1 stores an address AR and a resolution of the display device (display resolution) KD of the destination, associated with each other. The address AR is a data for identifying the destination. In this example, the telephone number of the destination is recorded as the address of the destination. Instead of the telephone number, URL (uniform resource locator), E-mail address, IP (internet protocol) address, etc. may be recorded.

These data are manually input by the user by operating the operation keys 61, and the information obtained from the communication is automatically recorded. By providing the display resolution table TB1, the display resolution KD of the destination can be obtained easily and rapidly.

When calling the destination with the portable terminal 12, the display resolution KD is obtained by referring the display resolution table TB1. If information about the destination is not recorded on the display resolution table TB1, the display resolution KD of the destination is obtained by any one of the following methods, and the destination and the resolution KD are added to the display resolution table TB1.

(1) The display resolution KD is obtained by a protocol when establishing a call.
(2) The display resolution KD is obtained based on the information transmitted from the destination, such as the type of the equipment of the destination, etc. Since, for example, each of the personal computer, the portable terminal, and portable visual telephone has the range of the standard display size depending on the type of device, the display resolution KD is estimated in accordance with their standard ranges.
(3) The display resolution KD is estimated based on the resolution of the image data transmitted from the destination. For example, the resolution of the transmitted image data is estimated as a display resolution KD or the display resolution KD is estimated to be not more than the resolution of the transmitted image data.

Moreover, the system control section 60 controls the whole of the portable terminal 12.

An estimating section ST is provided in the system control section 60 for estimating the display resolution KD of the display device of the destination.

As shown in FIG. 3, the operation keys 61 include numeric keys (ten keys) TK, UP key UK, DOWN key DK, function keys FK and so forth. The telephone number is input by the numeric keys TK. The modes, such as talking mode, image communication mode, display mode, imaging mode and the like are changed by the function keys FK. Presence or absence of just fitting size display, presence or absence of resolution control, and other mode settings, as well as zooming operation of the imaging section 30 are set by the UP key UK and the DOWN key DK. The system control section 60 outputs instructions depending on the operation contents of the operation keys 61.

Referring to FIG. 2 again, the antenna 62 transmits and receives a radio wave. The RF section 63 amplifies, modulates, and demodulates high-frequency signals. The voice and image multiplex/demultiplex section 64 multiplex the voice data and the image data, and demultiplex the multiplexed data. The voice codec 65 expands the compressed voice data and also compresses the voice data input from the microphone 68 via the voice I/O section 66. The voice I/O section 66 converts the voice data into the voice signals and outputs them via the speaker 67 as a voice sound. The voice I/O section 66 also converts the voice signals from the microphone 68 into the voice data. The power supply 69 comprises a battery and a DC-DC converter, and supplies the electric power to the whole of the portable terminal 12.

The communication management center 10 has the above-described functions as well as following functions.

FIG. 7 is a block diagram showing an example of the functions of the communication management center 10.

Referring to FIG. 7, the communication management center 10 includes a transmitting and receiving section 71, a modulation/demodulation section 72, a voice and image multiplex/demultiplex section 73, a data conversion section 74, an image conversion section 75, a display resolution detecting section 76, a memory 77, and a display resolution table TB2, and so forth.

The transmitting and receiving section 71 transmits and receives the data for relaying the data. The data conversion section 74 expands and compresses the data. The image conversion section 75 converts the color in addition to conversion of the resolution at a resolution conversion section 75a. The display resolution detecting section 76 detects the display resolution KD of the portable terminal 12 or the terminal device 14, both of which communicate with the communication management center 10. A variety of methods for detecting the display resolution KD are used.

For example, there are following methods; referring the display resolution table TB2; obtaining KD from a header HD of the transmission data DTS; obtaining KD by the pre-communication process in case of a new destination; and obtaining KD based on the resolution of the image data transmitted from the source to the destination. Especially, since, in case of the visual telephone, several pieces to several dozens of pieces of image data are transmitted and received in every second, the resolution of the display device of the source can be estimated from the resolution of one image data transmitted first.

In order to perform these processes, the transmission data is temporarily stored in the memory 77. All the transmission data are not simultaneously stored, but a part of data may be stored momentarily.

Next, there will be described the operations and the behaviors of the visual telephone by using the portable terminal 12.

The user calls the portable terminal 12 or the terminal device 14 of the destination by operating the numeric keys TK, etc. When the call is established and a line is connected, speaking can be performed by the microphone 68 and the speaker 67. At the same time, the image data taken by the imaging section 30 is transmitted to the destination and the image is displayed on the display device of the destination.

The image data transmitted from the destination is displayed on the LCD 41. A small window is provided on the LCD 41, and the monitor image of the image data taken by the imaging section 30 is displayed on this small window. When image data are not transmitted from the destination, the image data taken by the imaging section 30 can be displayed at a large size on the LCD 41.

As shown in FIG. 6, the transmission data DTS composed of the image data DTG and the header HD is transmitted to the destination. The resolution of the LCD 41, the resolution of the image data DTG, and the other information is recorded on the header HD as attribute information. Thus, the destination can obtain the resolution of the LCD 41 of the source portable terminal 12 by these information. The image data DTG may be compressed data, for example, such as a JPEG (Joint Photographic Experts Group) data.

When the just fitting size mode is set, the resolution of the image data transmitted from the destination is converted into that matched with the LCD 41, i.e., reduced in size. The conversion of the resolution is performed so as to maintain the aspect ratio of the image and to fully display the image on the display screen of the LCD 41. However, in case of original image data with lower resolution than that of the LCD 41, simple enlargement of the image is not performed, because simple enlargement of the image causes the degradation of image quality.

When the image data is transmitted to the destination from the portable terminal 12, the image data to be transmitted is converted into that with lower resolution corresponding to the resolution of the display device of the destination.

For the above purpose, the system control section 60 obtains the display resolution KD of the destination by referring the display resolution table TB1. In case of the destination whose information is not recorded on the display resolution table TB1, the resolution of the quarter of the VGA (Video Graphics Array) is used (320×240 pixels). In case of other than the visual telephone, the image data with the predetermined resolution is transmitted. When the resolution is not predetermined, the maximum resolution is normally set as a default value.

As to the method for obtaining the low resolution image data, the imaging control section 33 performs the readout control of the imaging sensor 32. By the method for obtaining the low resolution image data by controlling the readout of the imaging sensor 32, only a little energy is required for transferring the data from the imaging sensor 32, thereby the electric power consumption is reduced and the battery life becomes longer. Since data volume of the image data is reduced, the operation time required for the process is shortened. In the flow chart described later, the readout control of the imaging sensor 32 is performed in the low resolution imaging mode.

As described above, the image data can be read out with the maximum resolution from the imaging sensor 32 without thinning out, and can be converted into that with lower resolution at resolution conversion section 53.

Next, the process and the operation of the communication system 1 will now be described with referring to the flow charts.

At first, the process operation of the portable terminal 12 is described.

Figure 8:
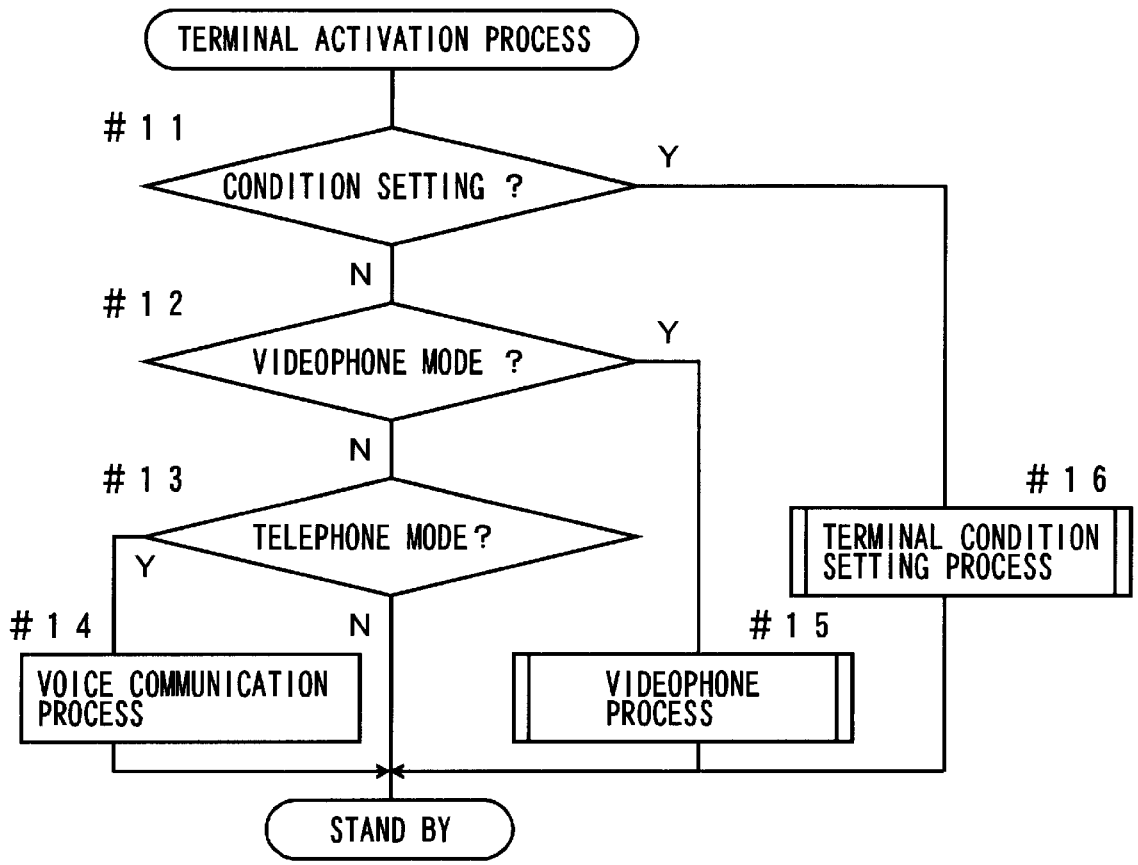
FIG. 8 is a flow chart showing an activation process of the portable terminal.
Figure 9:
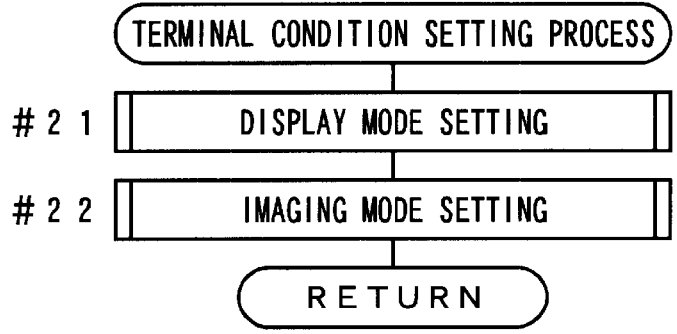
FIG. 9 is a flow chart showing a terminal condition setting process.
Figure 10:
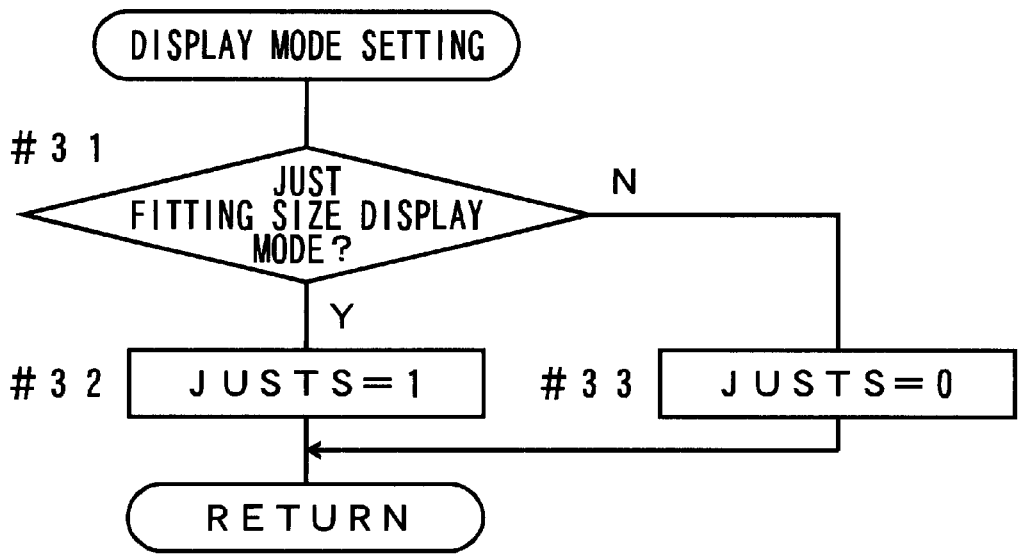
FIG. 10 is a flow chart showing a display mode setting process.
Figure 11:
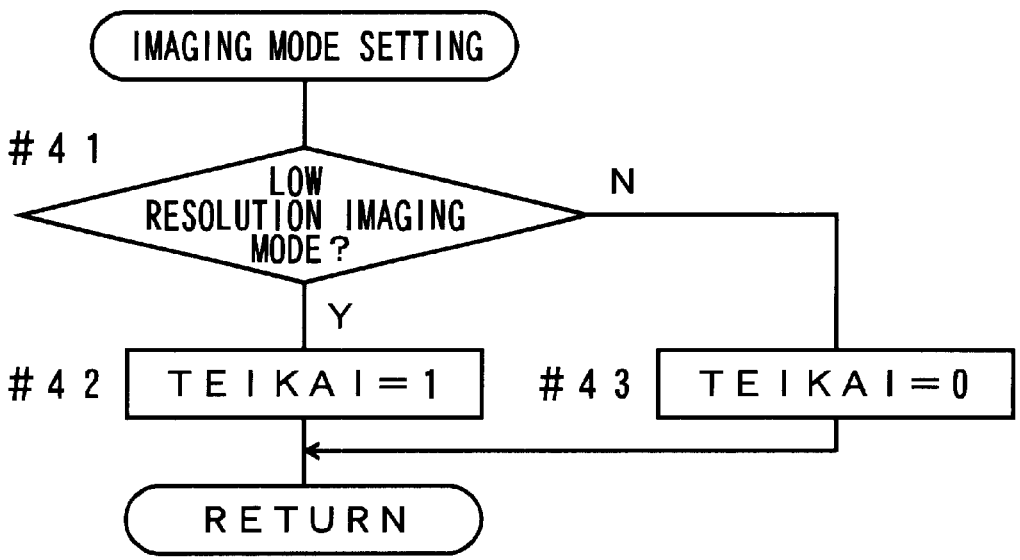
FIG. 11 is a flow chart showing an imaging mode setting process.
Figure 12:
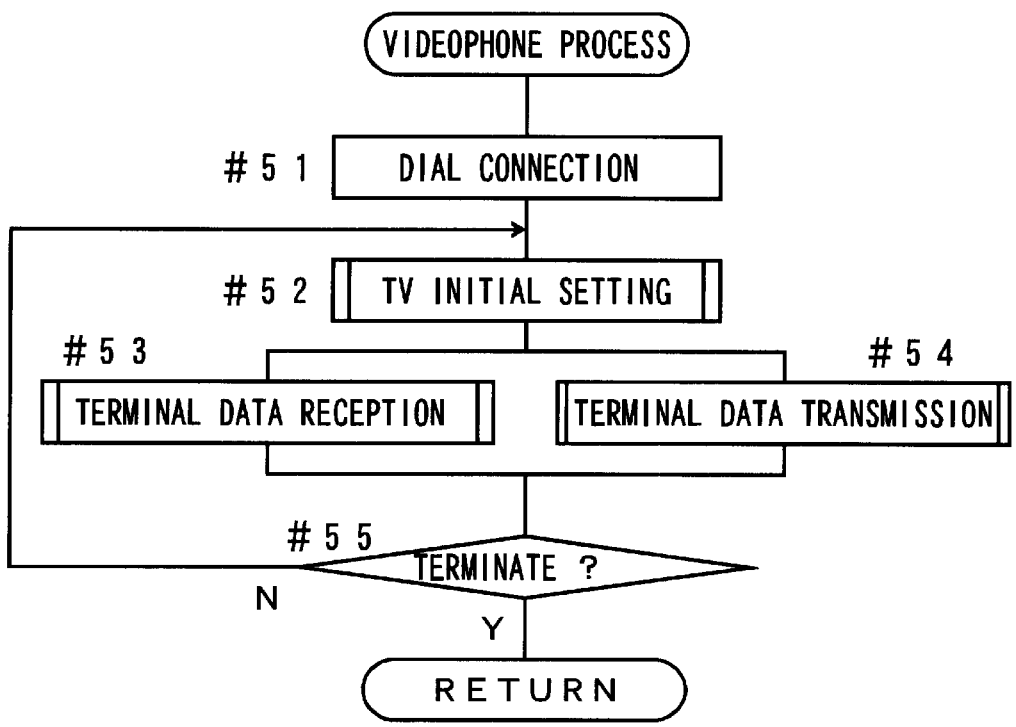
FIG. 12 is a flow chart showing a process of a visual telephone.
Figure 13:
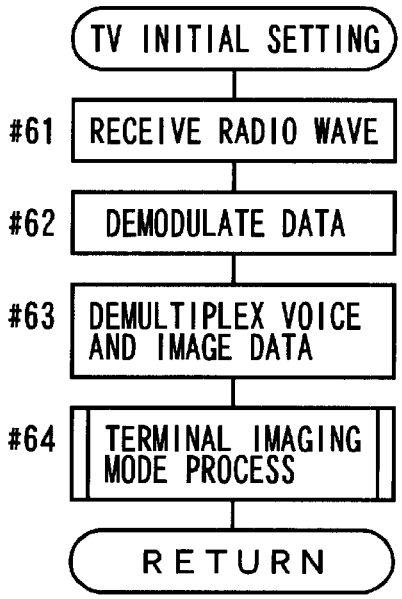
FIG. 13 is a flow chart showing a television initial setting process.
Figure 14:
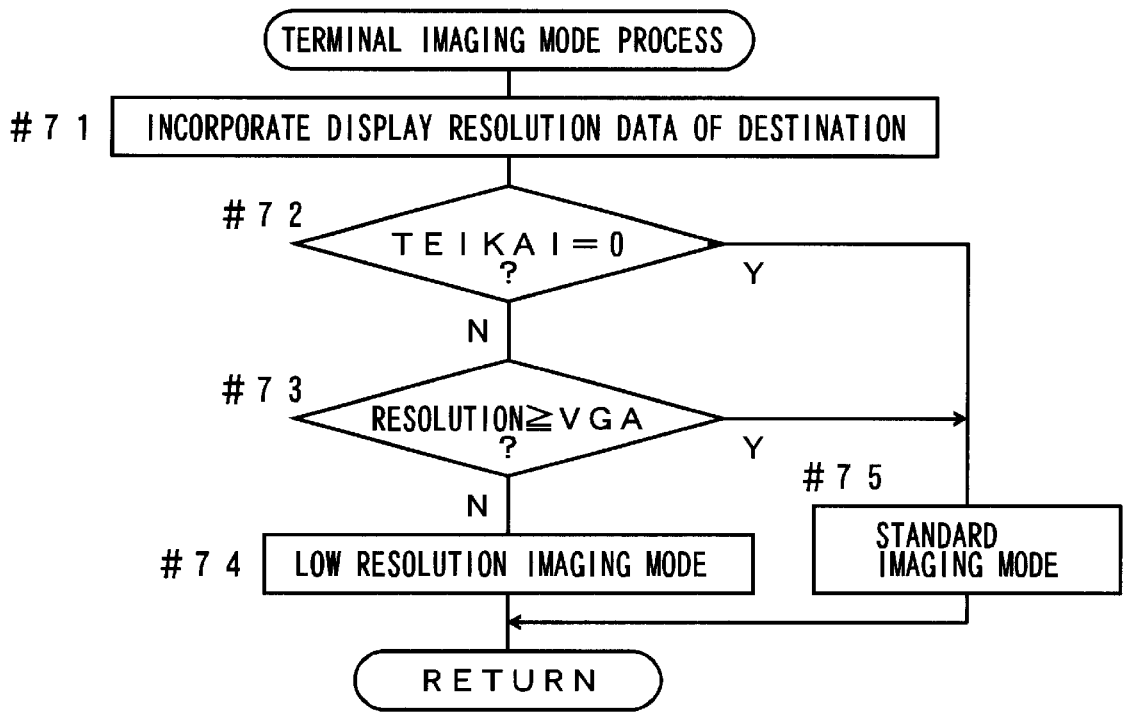
FIG. 14 is a flow chart showing a terminal imaging mode process.
Figure 15:
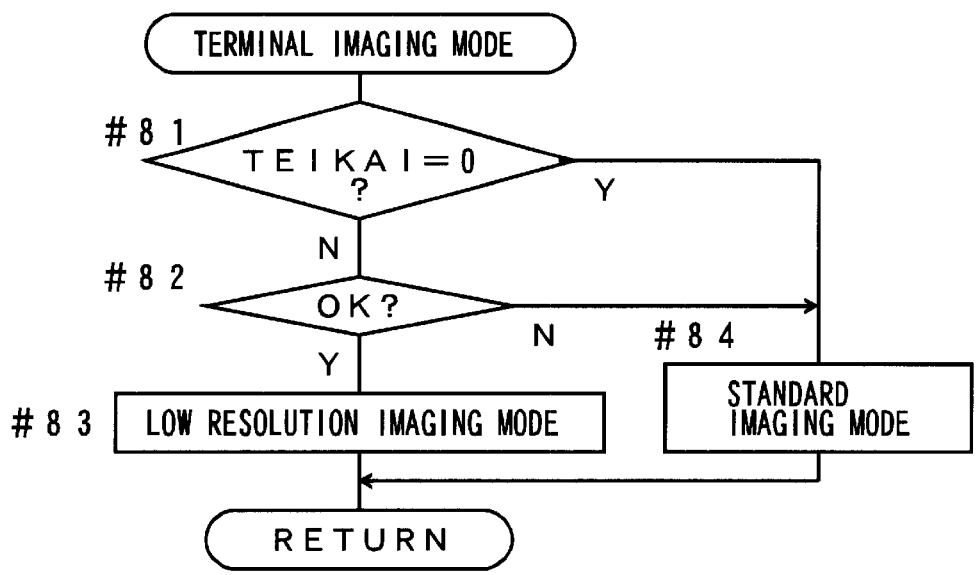
FIG. 15 is a flow chart showing another example of a terminal imaging mode process.
Figure 16:
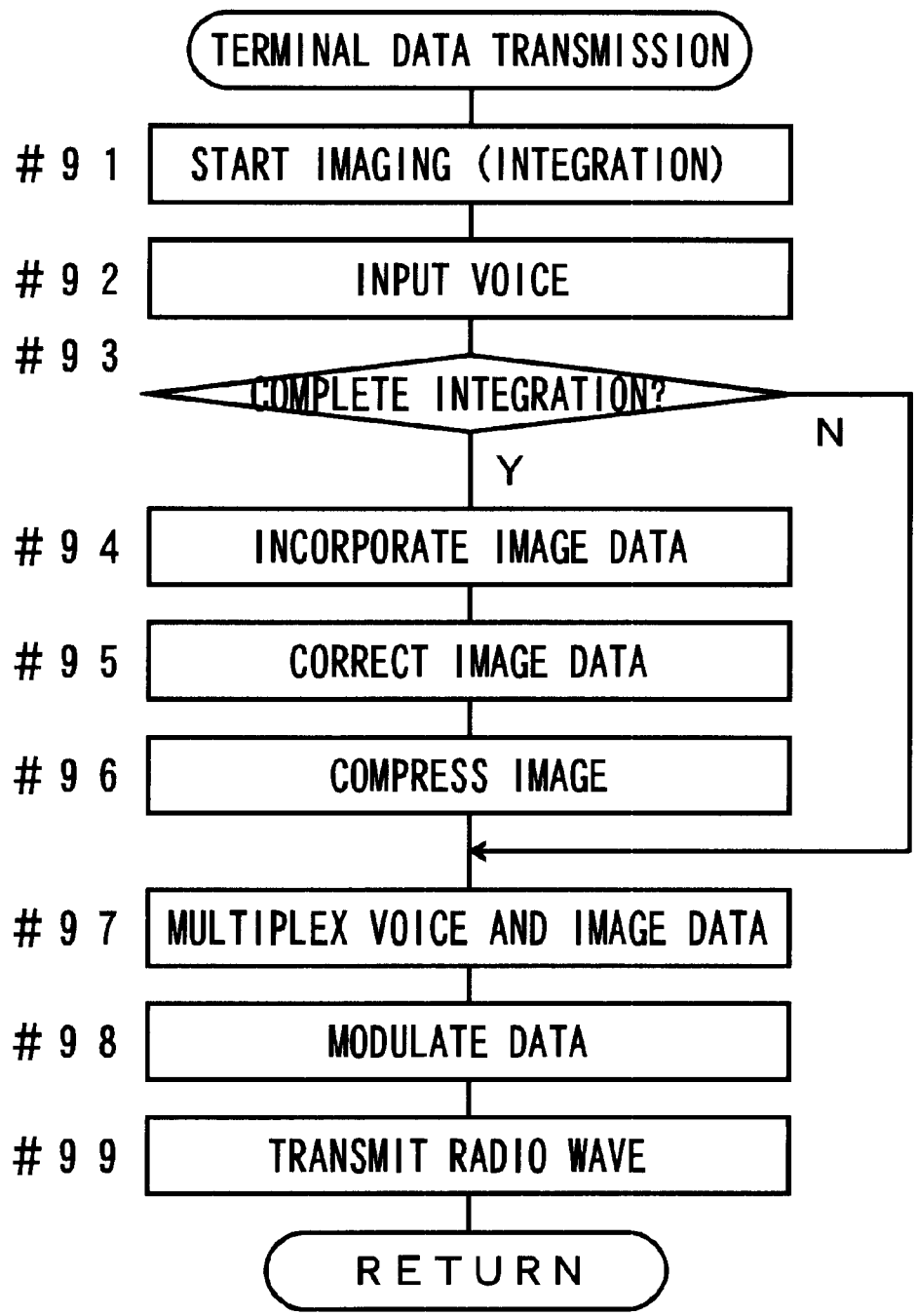
FIG. 16 is a flow chart showing a data transmission process.
Figure 17:
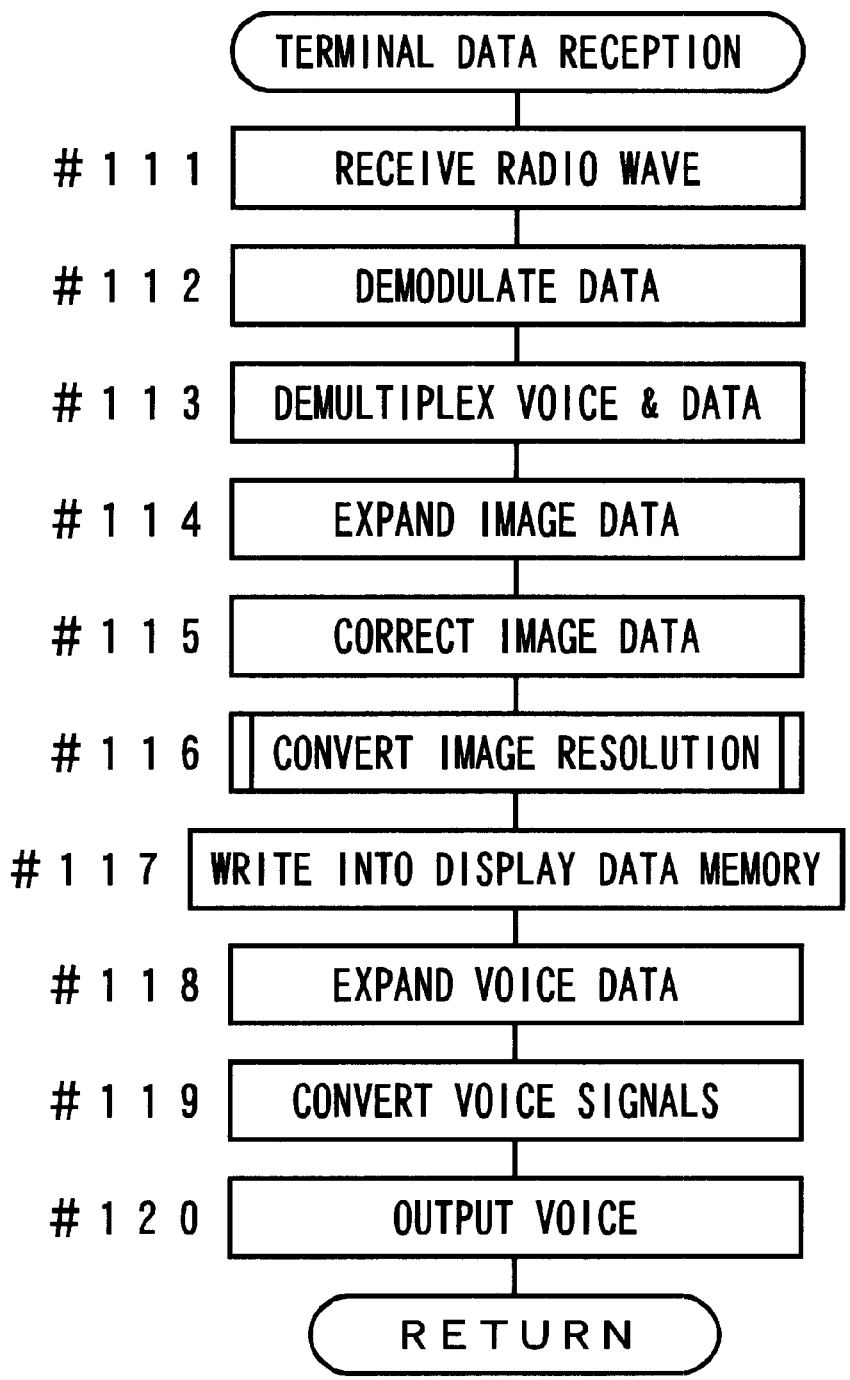
FIG. 17 is a flow chart showing a data receiving process.
Figure 18:
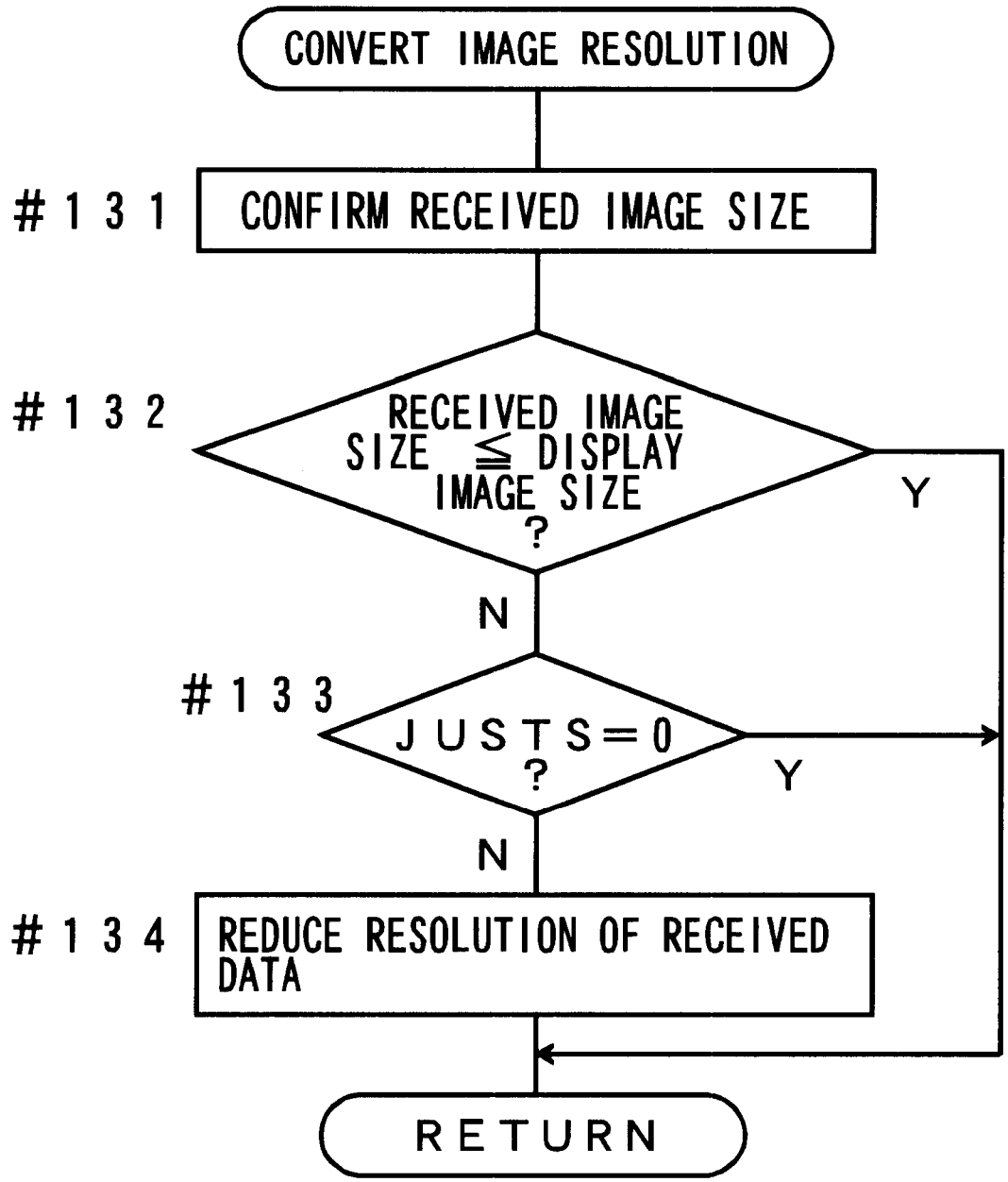
FIG. 18 is a flow chart showing an image resolution conversion process.

FIG. 8 is a flow chart showing an activation process of the portable terminal 12. FIG. 9 is a flow chart showing a terminal condition setting process. FIG. 10 is a flow chart showing a display mode setting process. FIG. 11 is a flow chart showing an imaging mode process. FIG. 12 is a flow chart showing a visual telephone process. FIG. 13 is a flow chart showing a television initial setting process. FIG. 14 is a flow chart showing a terminal imaging mode process. FIG. 15 is a flow chart showing another example of the terminal imaging mode process. FIG. 16 is a flow chart showing a data transmission process. FIG. 17 is a flow chart showing a data receiving process, and FIG. 18 is a flow chart showing an image resolution conversion process.

In the activation process of FIG. 8, when the portable terminal 12 is activated from the stand-by state by the operation of the operation keys 61, the purpose of activation is analyzed by the condition of the key pressed, etc. and the process according to the purpose is performed.

If the portable terminal 12 is activated for condition setting ("Yes" at step #11), the terminal condition setting process is performed (step #16). If the portable terminal 12 is activated in a visual telephone mode ("Yes" at step #12), the visual telephone process is performed (step #15). If the portable terminal 12 is activated in a telephone mode ("Yes" at step #13), the voice communication process is performed (step #14). In case of none of the above, the portable terminal 12 enters the stand-by state.

In the terminal condition setting process shown in FIG. 9, the user previously sets the display mode and the imaging mode. Before setting, the predetermined initial condition is set. The user performs the display mode setting (step #21), and imaging mode setting (step #22).

As shown in FIG. 10, the user determines whether or not to set the just fitting size display mode (step #31), if set, a flag JUSTS is set to "1" (step #32), and if does not set, the flag JUSTS is set to "0" (step #33).

In the just fitting size display mode, if the resolution of the received image data is higher than that of the LCD 41, the image data is miniaturized to fit with the resolution of the LCD 41 and is displayed. Therefore, in the just fitting size display mode, one page of the entire received image data can be displayed on the display screen of the LCD 41 at a time without scrolling.

By setting to the preferable display mode previously, the user does not need to be bothered about settings on every communication.

In FIG. 11, the user determines whether or not to set the low resolution imaging mode (step #41), if set, a flag TEIKAI is set to "1" (step #42), and if does not set, the flag TEIKAI is set to "0" (step #43).

In the initial state, the flag JUSTS and the flag TEIKAI are both set to "1."

As shown in FIG. 12, the connection is made with the destination by the dial connection (step #51). A sub-routine of the initial setting of the television is called and initial setting of the visual telephone mode is performed (step #52). And the terminal data receiving process and the terminal data transmission process are performed in parallel (steps #53, #54). These processes may be executed by 2 CPUs (central processing units), or may be executed by interrupting the process of one CPU. These processes are repeated until the communication connection is terminated (step #55).

In FIG. 13, a radio wave is received from the destination (step #61). The received radio wave is demodulated and the demodulated data is extracted (step #62). The extracted data is demultiplexed into voice data and image data (step #63). If the attribute information is included in header HD, etc., it is also extracted, separately. Then the sub-routine of the terminal imaging mode process is called and the setting of the imaging mode is performed.

In the terminal imaging mode process shown in FIG. 14, an actual imaging method is determined by the resolution of the display device of the destination (display resolution) KD, and the setting condition of the low resolution imaging mode stated above.

In FIG. 14, the data of the display resolution KD of the destination is incorporated (step #71). The display resolution KD may be incorporated based on the system data. If the system data does not exist, the display resolution KD may be estimated by expanding the first transmitted image data. In this case, it is estimated that the resolution of the transmitted image data is approximately matched with the display resolution KD.

The flag TEIKAI is checked, and if the flag is "0", i.e., the low resolution imaging mode is not set ("Yes" at step #72), a standard imaging mode is set (step #75). In the standard imaging mode, imaging is performed with the maximum resolution of the imaging sensor 32. The resolution of the standard imaging mode can be set separately.

Even if the flag TEIKAI is "1", i.e., the low resolution imaging mode is set ("No" at step #72), imaging is actually performed in a standard imaging mode (step #75), when the display resolution KD of the destination is high resolution, i.e., the display resolution KD of the destination is VGA size (640×480 pixels) or more. If the display resolution KD of the destination is less than VGA size, it is determined that the transmission of the high quality image data is not necessary, and imaging is actually performed in a low resolution imaging mode (step #74).

At step #71, instead of incorporating the data of display resolution KD of the destination, the display resolution KD can be determined based on the display resolution table TB1 provided in the system control section 60. That is, the telephone number of the destination currently communicated is retrieved from the display resolution table TB1, and the display resolution KD corresponding to the telephone number is read out. If this destination's number is not recorded on the display resolution table TB1, the user is informed of this. In this case, for example, the user manually inputs the resolution. The input resolution is registered on the display resolution table TB1, and thereby the data can be used from the next time.

In the terminal imaging mode process of FIG. 15, if the low resolution imaging mode is set ("No" at step #81), the user confirms it. And if the user indicates to accept the mode ("Yes" at step #82), the low resolution imaging mode is actually set (step #83). If the low resolution imaging mode is not set or if the user does not make an instruction to accept the mode even if it is set, the standard imaging mode is set (step #84). The user, for example, makes the suitable button displayed on the display screen, or operates the specific operation key in order to make an instruction whether the mode is accepted or not.

In the terminal data transmission process of FIG. 16, the image data taken by the imaging sensor 32 and the voice data input via the microphone 68 are multiplexed, and the multiplexed data is transmitted. That is, imaging (integrating) of the imaging sensor 32 is started according to the imaging mode set (step #91). The voice is input via the microphone 68 (step #92). Whether integrating of the imaging sensor 32 is completed or not is confirmed, and if it is not completed then the process jumps to the step #97.

If the integration of the imaging sensor 32 is completed, the image data is incorporated (step #94), the brightness or the color, etc. of the image data is corrected (step #95) and then the image data is compressed (step #96).

Next, the voice data previously incorporated and the image data are multiplexed (step #97). After the data modulation is conducted at the RF section 63 (step #98), the modulated signal is transmitted as a radio wave (step #99).

In the terminal data receiving process of FIG. 17, the received radio wave is demultiplexed into the voice data and the image data, and display of the data and output of the voice are performed.

In other words, the radio wave is received (step #111), and demodulated to make it as received data (step #112). The received data is demultiplexed into the voice data and the image data (step #113). Since the image data received is compressed, it is expanded (step #114), and the color or the brightness, etc. thereof is corrected (step #115). Then, the sub-routine of the image resolution conversion process is called and the resolution is converted according to the setting in order to display the image on the LCD 41. By writing the converted image data into the display data memory 42, the image is displayed on the LCD 41 (step #117).

As Since the received voice data is also compressed, it is expanded (step #118), then converted into the voice signals and output the voice from the speaker 67.

In FIG. 18, the resolution (size) of the received imaged data is confirmed (step #131). If the size of the received image data is larger than that of the display screen of the LCD 41 of the portable terminal 12 ("No" at step #132) and the just fitting size display mode is set ("No" at step #133), the resolution of the image data is converted so as to match the resolution of the LCD 41 (step #134). Otherwise the process is returned as it is.

Next, the process operation of the communication management center 10 will be described. This example mainly explains about the image conversion service effective for the case that image processing ability of the portable terminal 12 is poor and for the case that the power consumption of the battery is required to be suppressed.

Figure 19:
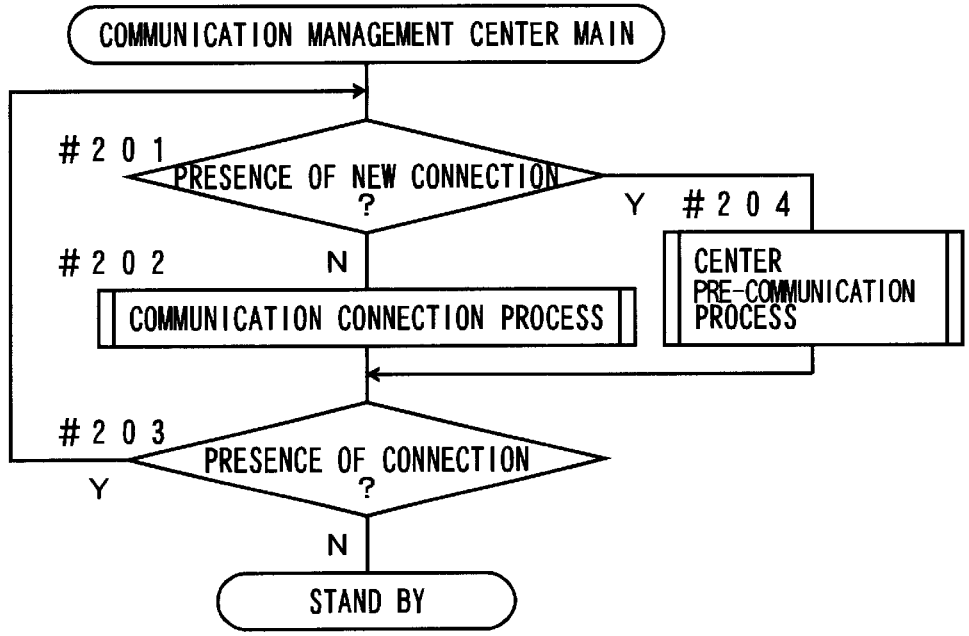
FIG. 19 is a main flow chart showing a routine process of the communication management center.
Figure 20:
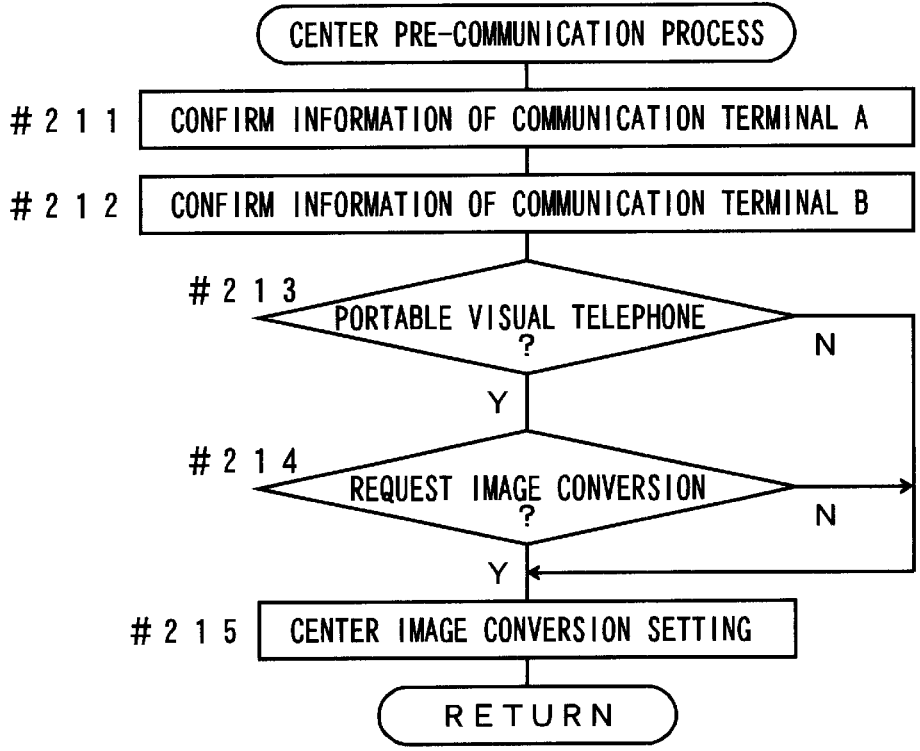
FIG. 20 is a flow chart showing a pre-communication process of the center.
Figure 21:
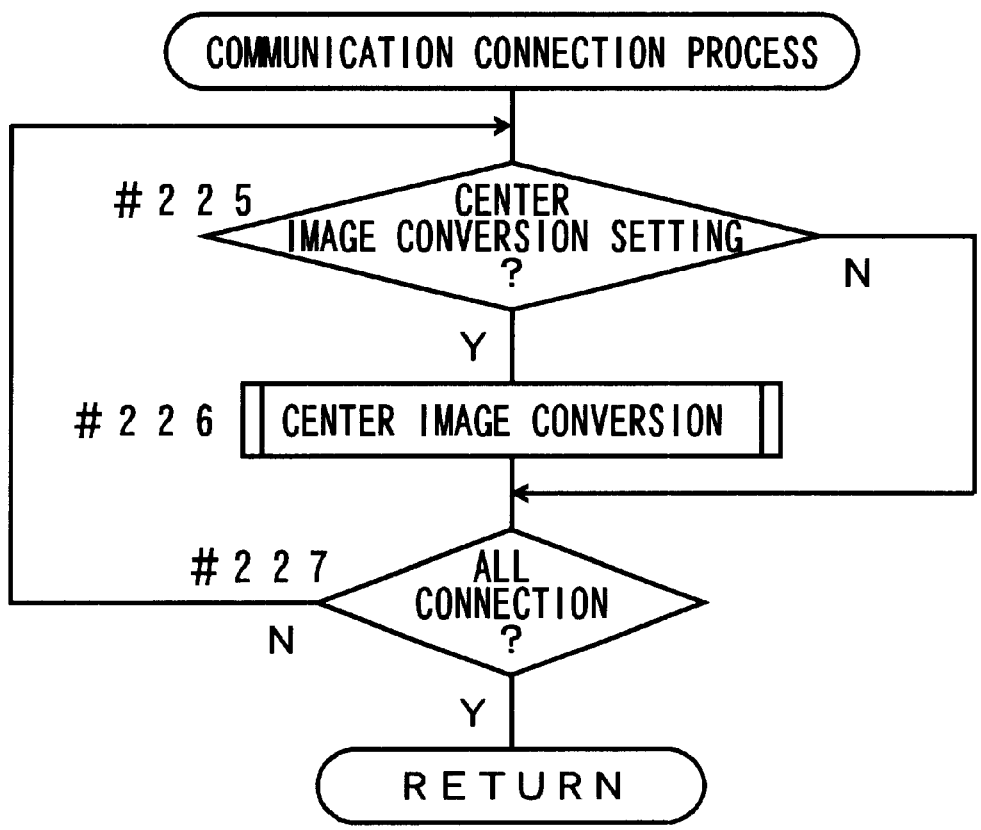
FIG. 21 is a flow chart showing a communication connection process.
Figure 22:
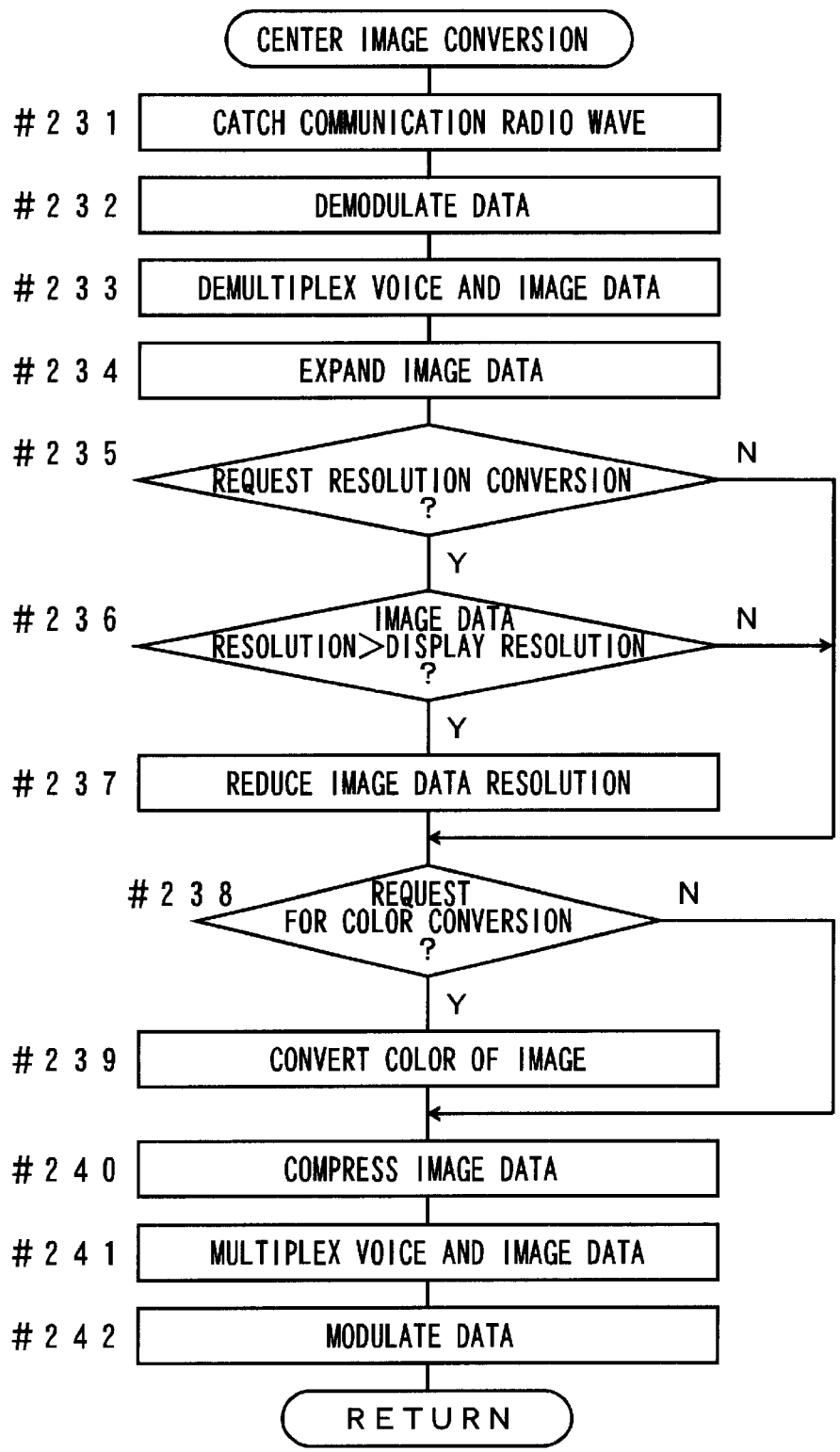
FIG. 22 is a flow chart showing an image conversion process of the center.

FIG. 19 is a flow chart showing a main process of the communication management center 10, FIG. 20 is a flow chart showing a pre-communication process of the center 10, FIG. 21 is a flow chart showing a communication connection process, and FIG. 22 is a flow chart showing an image conversion process of the center.

In FIG. 19, whether or not a new connection exists is confirmed at first (step #201). If the new connection exists, the pre-communication process of the center 10 is performed (step #204), and if not exist, the ongoing communication connection process is continued (step #202). This process is repeated during the connection exists (step #203). If the connection does not exist at all, the process is shifted to the stand-by state.

The pre-communication process of the center 10 of FIG. 20 is a sub-routine for catching the information from the terminals communicated each other, confirming whether or not the request is issued to the communication management center 10 and if the request is issued, preparing to response to the request.

That is, the information (including the request) of the communication terminal A of the calling side is caught and confirmed (step #211). This information includes imaging resolution, resolution of the display device (display resolution KD), type of the terminal (personal computer, portable terminal, portable visual telephone), and presence or absence of the image conversion request (resolution, color correction, etc.). Such information is recorded on, for example, the header HD.

Then, the information (including the request) of the communication terminal B of the receiving side is caught and confirmed (step #212).

It is confirmed whether or not at least one of the terminals of these sides is a portable terminal 12, i.e., a portable visual telephone (step #213). If neither of these is a portable visual telephone, the process is returned as it is.

If at least one of the terminals is a portable visual telephone ("Yes" at step #213), and there exists the image conversion request to the communication management center 10 ("Yes" at step #214), the center image conversion setting is performed (step #215). At this time, a flag for it is provided. This setting is confirmed both in the communication terminals A and B, and the setting is performed, respectively. The image conversion request includes two types of request, that is resolution conversion request and color conversion request.

In this example, it is set that the service is provided only for the portable visual telephone whose image conversion ability is low. However, if the communication management center 10 has enough capability, the service may be expanded to the other types of terminals.

In FIG. 21, while it is confirmed whether or not the center-image conversion setting is made on each communication connection (step #225), the center image conversion process is repeated for the communication for which the center image conversion is set (step #226). This process is repeated on every communication connection.

In the image center conversion process of FIG. 22, the image conversion is performed to the communication for which the center image conversion is set at the communication management center 10. For example, when the communication is performed between the portable visual telephone whose image conversion ability is low and the terminal using a high-speed personal computer, the image conversion at the center 10 is applied on the data received by the portable visual telephone. Thus, the process load of the portable visual telephone is reduced and the smooth communication can be done.

In FIG. 22, the communication radio wave is caught (step #231), and the data is demodulated (step #232). The data is demultiplexed into the voice data and the image data (step #233), and the compressed image data is expanded (step #234).

If the resolution conversion is requested ("Yes" at step #235), and the resolution of the image data is higher than that of the display device ("Yes" at step #236), the image data is converted (miniaturized) into the low resolution image data (step #237). If the color conversion is requested ("Yes" at step #238), the color of the image data is converted (step #239).

Then, the image data is compressed again (step #240), the voice data and the image data are multiplexed again (step #241), and the data modulation is performed (step #242).

It the above-described embodiment, an explanation is made about the case that the communication management center 10 performs the exchange control between the communication terminals, this is also applicable to other types of controls. For example, the communication management center 10 can be used as a server in the Internet.

In this case, it can be configured that photographs, CGs, and other images are uploaded to the memory 77 of the communication management center 10 via the Internet from the communication terminals such as a personal computer, and these images can be downloaded in response to the request to the communication terminals.

When the image is requested, the communication terminal specifies the specific image and informs of the resolution of the display device of the communication terminal. The resolution of the display device may be input by the user, or may be automatically obtained and transmitted by the system program of the communication terminal.

The communication management center 10 detects the informed resolution at the display resolution detection section 76, converts the resolution of the specified image based on the detected resolution, and transmits the converted image to the communication terminal which made the request. When the resolution of the communication terminal is registered on the display resolution table TB2 of the communication management center 10, the resolution can also be obtained from the table.

As mentioned above, by converting the image data at the communication management center 10 corresponding to the resolution of the communication terminal and transmitting the converted data to the communication terminal, the process load in the communication terminal is reduced. As usual, since the memory 77 of the communication management center 10 stores the high resolution image data and the resolution of the communication terminal is substantially lower than that at the center, data volume transmitted on the network is remarkably reduced compared with the case that the image data is transmitted without converting the resolution, thereby time duration and cost of communication are reduced.

In the embodiment described above, the whole or the part of the configuration, the contents and the order of the process of the communication management center 10, the portable terminal 12, the terminal device 14, or the communication system 1 can be modified appropriately within the spirit and the scope of the present invention.

According to the embodiment described above, data volume of the communication is reduced by controlling the transmission of the image data with the resolution corresponding to the resolution of the display device of the destination at the time of transmission of the image data from the communication terminals. Therefore, wasteful power consumption of the battery can be suppressed when the communication terminal apparatus is a portable device.

The resolution of the display device of the destination can be easily and rapidly obtained. The energy required for data transfer from the imaging sensor is reduced, thereby the electric power consumption is reduced, the life time of the battery is prolonged, and the rapid process can be achieved because of the reduced data volume of image data.

The data volume of communication is reduced by converting the resolution of the image data into lower resolution corresponding to the display device of the destination when the image data is relayed at the communication management center with which a plurality of communication terminals are connected. Therefore, the process load of the communication terminal can be reduced.

What is claimed is:

1. A communication terminal comprising:
    a memory for storing a table in which data for identifying a destination of communication and a resolution of a display device of the destination are associated with each other;
    an image processor for generating image data with a resolution of the display device of the destination based on the table; and
    a transmission section for transmitting the image data generated by the image processor.

2. The communication terminal according to claim 1 further comprising a sensor for taking an image and for providing the image processor with the image data.

3. The communication terminal according to claim 1 further comprising:
    a receiving section for receiving image data from the destination of communication; and
    a display section for displaying the image data received by the receiving section.

4. The communication terminal according to claim 3 further comprising an estimation section for estimating a resolution of the display device of the destination based on the received image data.

5. The communication terminal according to claim 4 further comprising a controller for registering data for identifying a destination of communication and the resolution estimated by the estimation section on the table when the data for identifying the destination is not stored in the table.

6. The communication terminal according to claim 1 further comprising:
    an input section for inputting the resolution of the display device of the destination of communication; and
    a controller for registering the input resolution of the display device and the data for identifying the destination of communication in association with each other on the table.

7. A communication terminal comprising:
    a receiving section for receiving data from a destination of communication;
    an estimation section for estimating a resolution of a display device of the destination based on the data received by the receiving section;
    an image processor for generating image data with the resolution of the display device of the destination estimated by the estimation section; and
    a transmission section for transmitting the image data generated by the image processor.

8. The communication terminal according to claim 7, wherein:
    the receiving section receives image data from the destination of communication; and
    the estimation section estimates the resolution of the display device of the destination based on the resolution of the image data.

9. The communication terminal according to claim 7, wherein:
    the receiving section receives data about the type of the communication device from the destination of communication; and
    the estimation section estimates the resolution of the display device of the destination based on the type of the communication device.

10. A method for transmitting image data, comprising the steps of:
    generating image data with a resolution of a display device of a destination of communication based on a table in which data for identifying the destination and the resolution of the display device of the destination are associated with each other; and
    transmitting the generated image data to the destination.

11. A method for transmitting image data, comprising the steps of:
    receiving data from a destination of communication;
    estimating a resolution of a display device of the destination based on the received data;
    generating image data with the estimated resolution of the display device of the destination; and
    transmitting the generated image data to the destination.

12. A method for relaying image data in a communication management center with which a plurality of communication terminals are connected, the method comprising the steps of:

temporarily storing image data transmitted from communication terminals at the communication management center;

converting the image data into low resolution image data corresponding to the resolution of a display device of the communication terminal of a destination to which the image data is to be transmitted at the transmission of the stored image data to the communication terminals; and transmitting the converted low resolution image data to the destination.

13. A communication management center with which a plurality of communication terminals are connected and transmitting and receiving image data to/from each communication terminal, the communication management center comprising:

a display resolution detection section for obtaining information about a resolution of a display device of the communication terminal;

a resolution conversion section for converting the image data transmitted from the communication terminal into low resolution image data based on the information about the resolution obtained by the display resolution detection section; and a transmission section for transmitting the low resolution image data obtained by converting the data at the resolution conversion section to the destination.

14. The communication management center according to claim 13 further comprising:

a display resolution table for storing an address and a resolution of a display device of each communication terminal, associated with each other, and wherein the display resolution detection section obtains information about the resolution by referring to the display resolution table.

15. The communication management center according to claim 13, wherein the display resolution detection section obtains information about the resolution of the display device of the communication terminal based on attribute information of the image data received from the communication terminal.

16. The communication management center according to claim 13, wherein the display resolution detection section obtains information about the resolution of the display device of the communication terminal based on the resolution of the image data received from the communication terminal.

17. The communication management center according to claim 13, wherein the display resolution detection section obtains information about the resolution of the display device of the communication terminal based on type information received from the communication terminal.

18. A communication management center with which a plurality of communication terminals are connected and for transmitting and receiving image data to/from each communication terminal, the communication management center comprising:

a memory for storing a plurality of image data transmitted from the communication terminal;

a display resolution detection section for obtaining information about the resolution of the display device of the communication terminal;

a resolution conversion section for converting the image data specified among the stored image data into low resolution image data based on the information about the resolution obtained by the display resolution detection section; and a transmission section for transmitting the low resolution image data obtained by converting the data at the resolution conversion section to the communication terminal which made the designation.

* * * * *